US009604206B2

(12) United States Patent
Yonemura et al.

(10) Patent No.: US 9,604,206 B2
(45) Date of Patent: *Mar. 28, 2017

(54) METHOD FOR REGENERATING COS HYDROLYSIS CATALYST

(71) Applicant: MITSUBISHI HEAVY INDUSTRIES, LTD., Tokyo (JP)

(72) Inventors: Masanao Yonemura, Tokyo (JP); Akihiro Sawata, Tokyo (JP); Yukio Tanaka, Tokyo (JP); Hiroshi Yoshioka, Tokyo (JP); Toshinobu Yasutake, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/898,325

(22) PCT Filed: Oct. 20, 2014

(86) PCT No.: PCT/JP2014/077838
§ 371 (c)(1),
(2) Date: Dec. 14, 2015

(87) PCT Pub. No.: WO2015/060251
PCT Pub. Date: Apr. 30, 2015

(65) Prior Publication Data
US 2016/0144354 A1    May 26, 2016

(30) Foreign Application Priority Data

Oct. 23, 2013 (JP) .................................. 2013-220607

(51) Int. Cl.
| | | |
|---|---|---|
| *B01J 38/60* | (2006.01) | |
| *B01J 38/64* | (2006.01) | |
| *B01J 23/90* | (2006.01) | |
| *B01J 23/92* | (2006.01) | |

(52) U.S. Cl.
CPC .............. *B01J 38/64* (2013.01); *B01J 23/90* (2013.01); *B01J 23/92* (2013.01); *B01J 38/60* (2013.01)

(58) Field of Classification Search
CPC ............ B01J 38/60; B01J 21/20; B01J 23/96
USPC ......................................................... 502/27
See application file for complete search history.

(56) References Cited

U.S. PATENT DOCUMENTS

| | | |
|---|---|---|
| 3,282,831 A | 11/1966 | Hamm et al. |
| 4,835,338 A | 5/1989 | Liu |
| 5,942,201 A | 8/1999 | Hartmann |
| 2009/0239736 A1 | 9/2009 | Schmidt et al. |
| 2016/0136636 A1* | 5/2016 | Yonemura ............... B01J 23/92 502/25 |

FOREIGN PATENT DOCUMENTS

| | | |
|---|---|---|
| CN | 1329941 A | 1/2002 |
| CN | 101670302 A | 3/2010 |
| CN | 101961654 A | 2/2011 |
| CN | 102500429 A | 6/2012 |
| CN | 102921477 A | 2/2013 |
| EP | 2987553 A1 | 2/2016 |
| JP | 61-212524 A | 9/1986 |
| JP | 6-218230 A | 8/1994 |
| JP | 2001-162174 A | 6/2001 |
| JP | 2004-75712 A | 3/2004 |
| JP | 2006-143959 A | 6/2006 |
| JP | 2009-233634 A | 10/2009 |

OTHER PUBLICATIONS

Wang et al., "Reactivation of CoNiAl Calcined Hydrotalcite-like Compounds for Hydrolysis of Carbonyl Sulfide", Industrial & Engineering Chemistry Research, 2013, vol. 52, pp. 9331-9336, with abstract, cited in ISR and Written Opinion (6 pages).
International Search Report dated Dec. 22, 2014, issued in counterpart Application No. PCT/JP2014/077838 w/English translation (4 pages).
Written Opinion dated Dec. 22, 2014, issued in counterpart Application No. PCT/JP2014/077838 w/English translation (6 pages).
Australian Patent Examination Report dated Jun. 8, 2016, issued in counterpart Australian Patent Application No. 2014337659. (6 pages).
Extended (Supplementary) European Search Report dated Oct. 31, 2016, issued in counterpart European Patent Application No. 14855014.8. (10 pages).
Office Action dated Nov. 22, 2016, issued in counterpart Chinese Application No. 201480032477.6, with English translation.

\* cited by examiner

*Primary Examiner* — Edward Johnson
(74) *Attorney, Agent, or Firm* — Westerman, Hattori, Daniels & Adrian, LLP

(57) ABSTRACT

A method for regenerating a carbonyl sulfide (COS) hydrolysis catalyst for hydrolyzing COS which is contained in a gas obtained by gasifying a carbon material, wherein a spent COS hydrolysis catalyst is immersed in an acid solution for a prescribed time thereby removing poisoning substances adhering to the surface of the COS hydrolysis catalyst; and thus regenerating the COS hydrolysis catalyst.

6 Claims, 2 Drawing Sheets

METHOD FOR REGENERATING COS HYDROLYSIS CATALYST

TECHNICAL FIELD

The present invention relates to a method for regenerating a COS hydrolysis catalyst.

BACKGROUND ART

In recent years, there has been a demand for the effective utilization of low-quality fuels such as coal or heavy oil from the perspective of diversification so as to actively use low-quality fossil fuels in addition to high-quality fossil fuels. In addition, integrated coal gasification combined cycle (IGCC), in which gas turbines using gas fuel and steam turbines are used in combination, and power generation by means of introducing hydrocarbon gas into fuel cells are also becoming widespread from the perspective of improving power generation efficiency in the field of thermal power generation. Therefore, there is research and development underway to gasify low-quality fuels and use them for such power generation.

Incidentally, a low-quality fuel typically contains a large amount of sulfur compounds, and when a gas obtained by gasifying, this fuel is combusted directly, the sulfur compounds are discharged from the chimney into the atmosphere as sulfur oxides, which become a source of environmental pollution such as acid rain. Therefore, in ordinary thermal power generation, a method of installing an exhaust gas desulfurizer on the downstream side of the boiler so as to remove sulfur compounds as gypsum, for example, has been put into practical application. However, in combined cycle power generation the inlet temperature of a gas turbine is higher than the boiler temperature in ordinary thermal power generation, so the corrosion of the material is substantial. Therefore, it is necessary to protect the material by removing various impurities such as sulfur compounds on the upstream side rather than the downstream side of the gas turbine. For example, when installing a fuel cell power generator, it is essential to secure power generation efficiency and durability by protecting the material, and various impurities must be similarly removed on the upstream side of the fuel cell.

A so-called wet gas purification process, wherein water-soluble components are removed with a water scrubber and hydrogen sulfide ($H_2S$) is removed with an aqueous amine solution, has been put into practical application as such a method for removing impurities. However, although hydrogen sulfide ($H_2S$) can be removed with an aqueous amine solution, carbonyl sulfide (COS) cannot be removed. Therefore, a hydrolysis reaction expressed by formula (1) is performed using a COS hydrolysis catalyst so as to accelerate a reaction for converting the substance into the form of hydrogen sulfide ($H_2S$) which can be removed with an aqueous amine solution.

$$COS + H_2O \rightarrow H_2S + CO_2 \qquad (1)$$

Here, examples of known COS hydrolysis catalysts include catalysts containing titania, catalysts containing alumina, a group IV metal and barium, and catalysts containing an alkali metal, chromium oxide, and alumina (Patent Document 1).

Incidentally, in integrated coal gasification combined cycle (IGCC), there is a problem in that when a COS hydrolysis catalyst is used continuously for COS in a gasified gas, so-called catalyst poisoning occurs, wherein the dust content (for example, sulfides) in the gasified gas covers the surface of the COS hydrolysis catalyst, which causes a decrease in catalyst performance.

The catalyst with reduced performance as a result of poisoning is reused by means of regeneration treatment.

A method of performing heat treatment on as catalyst and then re-supporting sodium carbonate, for example, has been proposed as such a catalyst regeneration method (Patent Document 2).

CITATION LIST

Patent Literature(s)

Patent Document 1: Japanese Unexamined Patent Application Publication No. 2004-75712A
Patent Document 2: Japanese Unexamined Patent Application Publication No. 2001-162174A

SUMMARY OF INVENTION

Technical Problem

A method for regenerating a COS catalyst according to conventional technology has a problem in that since the active component of the catalyst is once again supported, the cost of relatively expensive chemicals such as potassium carbonate and sodium carbonate increases.

Therefore, there is a demand for the emergence of a method for regenerating a COS hydrolysis catalyst without using relatively expensive chemicals, whereby catalyst regeneration is inexpensive.

In light of the problem described above, an object of the present invention is to provide a method for inexpensively regenerating a COS hydrolysis catalyst.

Solution to Problem

In order to solve the problem described above, a first invention of the present invention is a method for regenerating a carbonyl sulfide (COS) hydrolysis catalyst by hydrolyzing COS which is contained in a gas obtained by gasifying a carbon raw material, wherein a spent COS hydrolysis catalyst is immersed in an acid solution for a prescribed amount of time.

With the present invention, by immersing a spent, degraded COS hydrolysis catalyst in an acid solution, poisoning components such as sulfides adhering to the catalyst surface are removed, which makes it possible to regenerate the catalyst.

A second invention is a method for regenerating a carbonyl sulfide (COS) hydrolysis catalyst by hydrolyzing COS which is contained in a gas obtained by gasifying a carbon raw material, wherein a spent COS hydrolysis catalyst is immersed in an alkali solution for a prescribed amount of time and then immersed in an acid solution for a prescribed amount of time.

With the present invention, by immersing a spent, degraded COS hydrolysis catalyst in an alkali solution and then immersing the catalyst in an acid solution so as to neutralize the solution, poisoning components such as sulfides adhering to the catalyst surface are removed, which makes it possible to regenerate the catalyst.

A third invention is a method for regenerating a carbonyl sulfide (COS) hydrolysis catalyst by hydrolyzing COS which is contained in a gas obtained by gasifying a carbon raw material, wherein a spent COS hydrolysis catalyst is immersed in an acid solution for a prescribed amount of time and then immersed in an alkali solution for a prescribed amount of time.

With the present invention, by immersing a spent, degraded COS hydrolysis catalyst in an acid solution and then immersing the catalyst in an alkali solution so as to neutralize the solution, poisoning components such as sulfides adhering to the catalyst surface are removed, which makes it possible to regenerate the catalyst.

A fourth invention is the method for regenerating a COS hydrolysis catalyst according to one of the first through third inventions, wherein the immersion is performed in a prescribed heated state (for example, 60° C. to 80° C.).

With the present invention, by immersing a spent, degraded COS hydrolysis catalyst in an acid solution in a heated state, poisoning components such as sulfides adhering to the catalyst surface are removed, which makes it possible to regenerate the catalyst.

Advantageous Effects of Invention

With the present invention, poisoning components adhering to a COS hydrolysis catalyst can be removed by performing chemical washing with an acid, an alkali, or the like, which makes it possible to reuse the substance.

BRIEF DESCRIPTION OF DRAWING(S)

DESCRIPTION OF EMBODIMENTS

Figure 1:
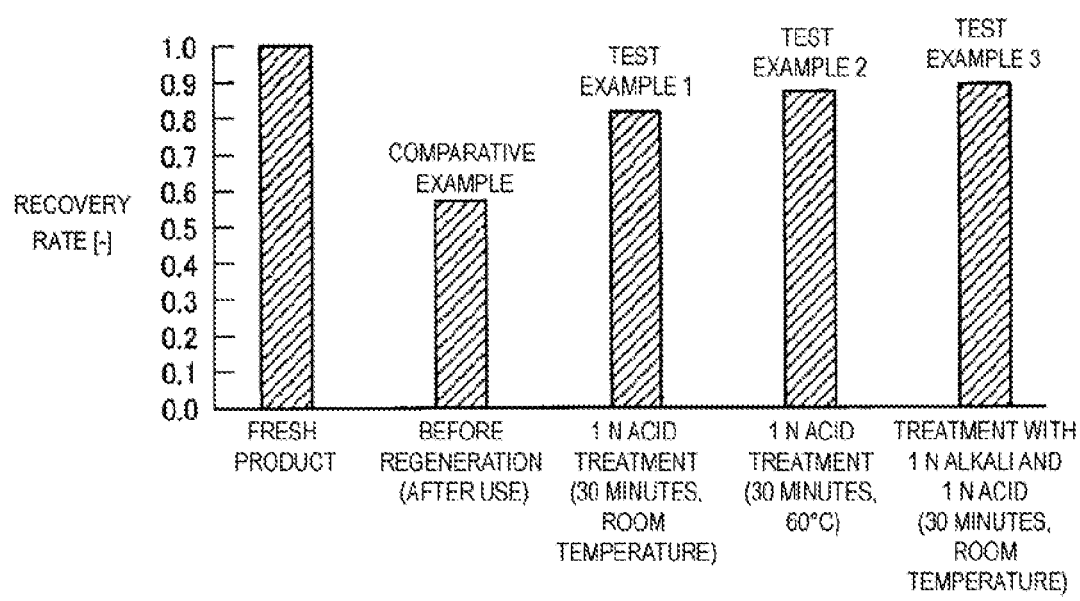
FIG. 1 illustrates the results of testing the catalyst recovery rate under various conditions.

The following is a detailed description of preferred embodiments with reference to the attached drawings. Note that the invention is not limited by the embodiments, and when a plurality of embodiments are present, the invention is intended to include a configuration combining these embodiments.

Embodiment 1.

The method for regenerating a COS hydrolysis catalyst according to Embodiment 1 will be described.

The method for regenerating a COS hydrolysis catalyst according to Embodiment 1 is a method for regenerating a carbonyl sulfide (COS) hydrolysis catalyst by hydrolyzing COS which is contained in a gas obtained by gasifying a carbon raw material such as coal, for example, wherein a spent COS hydrolysis catalyst is immersed in an acid solution for a prescribed amount of time.

The procedure of the method for regenerating a catalyst according to Embodiment 1 will be described hereinafter.

(1) First, a COS hydrolysis catalyst with which a COS conversion device of a coal gasification power plant has been filled is extracted.

(2) The dust content adhering to the extracted COS hydrolysis catalyst is removed by a gas spraying device such as an air blower.

(3) Next, a prescribed amount of an acid solution is placed in an immersion vessel, and the air-blown COS hydrolysis catalyst is immersed in the acid solution. Here, the amount of the acid solution is at least an amount which allows the COS hydrolysis catalyst to be sufficiently hidden. More preferably, the amount is such that the volume ratio of the acid solution/COS hydrolysis catalyst is at least 3.

As the acid solution, sulfuric acid ($H_2SO_4$), hydrochloric acid (HCl), nitric acid ($HNO_3$), or the like with a concentration of at least 0.1 N and approximately 1 N can be used.

In this chemical treatment, when the chemical solution is heated (for example, 60 to 80° C.), the removal efficiency of adhering sulfides or the like improves.

(4) The substance is left and immersed for approximately 15 to 60 minutes in this immersed state.

(5) The immersed COS hydrolysis catalyst is then immersed and water-washed in water (for example, ion-exchanged water) prepared in a separate vessel. Here, the amount of the water washing solution is at least an amount which allows the COS hydrolysis catalyst to be sufficiently hidden. More preferably, the amount is such that the volume ratio of water/COS hydrolysis catalyst is at least 3.

(6) The substance is left and water-washed for approximately 15 to 60 minutes, for example, in this immersed state.

(7) After water washing, the COS hydrolysis catalyst is taken out and dried after excess liquid in the catalyst is removed.

Drying may be performed by means of natural drying or heat drying. Here, in the case of heat drying, the temperature is preferably from 80° C. to 200° C. and particularly preferably from 110° C. to 150° C.

By performing chemical washing with an acid in this way, poisoning components adhering to a COS hydrolysis catalyst can be removed, which makes it possible to reuse the substance.

Here, the dust removal by means of air blowing in step (2) can be omitted depending on the amount of dust adhering to the catalyst.

Embodiment 2.

The method for regenerating a COS hydrolysis catalyst according to Embodiment 2 will be described.

The method for regenerating a COS hydrolysis catalyst according to Embodiment 2 is as method for regenerating a carbonyl sulfide (COS) hydrolysis catalyst by hydrolyzing COS which is contained in a gas obtained by gasifying a carbon raw material such as coal, for example, wherein a spent COS hydrolysis catalyst is immersed in an alkali solution for a prescribed amount of time.

The procedure of the method for regenerating a catalyst according to Embodiment 2 will be described hereinafter.

(1) First, a catalyst with which a COS conversion device of a coal gasification power plant has been filled is extracted.

(2) The dust content adhering to the extracted COS hydrolysis catalyst is removed by a gas spraying device such as an air blower.

(3) Next, a prescribed amount of an alkali solution is placed in an immersion vessel, and the air-blown COS hydrolysis catalyst is immersed in the alkali solution. Here, the amount of the alkali solution is at least an amount which allows the COS hydrolysis catalyst to be sufficiently immersed. More preferably, the amount is such that the volume ratio of the alkali solution/COS hydrolysis catalyst is at least 3.

As the alkali solution, sodium hydroxide (NaOH), ammonia water ($NH_4OH$), sodium carbonate ($Na_2CO_3$), or the like with a concentration of at least 0.1 N and approximately 1 N can be used.

In this chemical treatment, when the chemical solution is heated (for example, 60 to 80° C.), the removal efficiency of adhering sulfides or the like improves.

(4) The substance is left and immersed for approximately 15 to 60 minutes, for example, in this immersed state.

(5) The immersed COS hydrolysis catalyst is then immersed and water-washed in water (for example, ion-exchanged water) prepared in a separate vessel. Here, the amount of the water washing solution is at least an amount which allows the COS hydrolysis catalyst to be sufficiently hidden. More preferably, the amount is such that the volume ratio of water/COS hydrolysis catalyst is at least 3.

(6) The substance is left and water-washed for approximately 15 to 60 minutes, for example, in this immersed state.

(7) After water washing, the COS hydrolysis catalyst is taken out and dried after excess liquid in the catalyst is removed.

Drying may be performed by means of natural drying or heat drying. In addition, the substance may also be calcined.

By performing chemical washing with an alkali in this way, poisoning components adhering to a COS hydrolysis catalyst can be removed, which makes it possible to reuse the substance.

Embodiment 3.

The method for regenerating a COS hydrolysis catalyst according to Embodiment 3 will be described.

The method for regenerating a COS hydrolysis catalyst according to Embodiment 3 is a method for regenerating a carbonyl sulfide (COS) hydrolysis catalyst by hydrolyzing COS which is contained in a gas obtained by gasifying a carbon raw material such as coal, for example, wherein a spent COS hydrolysis catalyst is immersed in an alkali solution for a prescribed amount of time and then immersed in an acid solution for a prescribed amount of time.

The procedure of the method for regenerating a catalyst according to Embodiment 3 will be described hereinafter.

(1) First, a catalyst with which a COS conversion device of a coal gasification power plant has been filled is extracted.

(2) The dust content adhering to the extracted COS hydrolysis catalyst is removed by a gas spraying device such as an air blower.

(3) Next, a prescribed amount of an alkali solution is placed in an immersion vessel, and the air-blown COS hydrolysis catalyst is immersed in the alkali solution. Here, the amount of the alkali solution is at least an amount which allows the COS hydrolysis catalyst to be sufficiently hidden. More preferably, the amount is such that the volume ratio of the alkali solution/COS hydrolysis catalyst is at least 3.

As the alkali solution, sodium hydroxide (NaOH), ammonia water ($NH_4OH$), sodium carbonate ($Na_2CO_3$), or the like with a concentration of at least 0.1 N and approximately 1 N can be used.

In this chemical treatment, when the chemical solution is heated (for example, 60 to 80° C.), the removal efficiency of adhering sulfides or the like improves.

(4) The substance is left and immersed for approximately 15 to 60 minutes, for example, in this immersed state.

(5) Next, a prescribed amount of an acid solution is placed in a separate immersion vessel, and the alkali-treated COS hydrolysis catalyst is immersed in the acid solution. Here, the amount of the acid solution is at least an amount which allows the COS hydrolysis catalyst to be sufficiently hidden. More preferably, the amount is such that the volume ratio of the acid solution/COS hydrolysis catalyst is at least 3.

As the acid solution, sulfuric acid ($H_2SO_4$), hydrochloric acid (HCl) nitric acid ($HNO_3$), or the like with a concentration of at least 0.1 N and approximately 1 N can be used.

In this chemical treatment, when the chemical solution is heated (for example, 60 to 8020 C.), the removal efficiency of adhering sulfides or the like improves.

(6) Further, the immersed COS hydrolysis catalyst is then immersed and water-washed in water (for example, ion-exchanged water) prepared in a separate vessel. Here, the amount of the water washing solution is at least an amount which allows the COS hydrolysis catalyst to be sufficiently hidden. More preferably, the amount is such that the volume ratio of water/COS hydrolysis catalyst is at least 3.

(7) The substance is left and water-washed for approximately 15 to 60 minutes, for example, in this immersed state.

(8) After water washing, the COS hydrolysis catalyst is taken out and dried after excess liquid in the catalyst is removed.

Drying may be performed by means of natural drying or heat drying. In addition, the substance may also be calcined.

By performing chemical washing with an alkali and then neutralizing the substance with an acid in this way, poisoning components adhering to a COS hydrolysis catalyst can be removed, which makes it possible to reuse the substance.

Embodiment 4.

The method for regenerating a COS hydrolysis catalyst according to Embodiment 4 will be described.

Embodiment 4 is a method for regenerating a carbonyl sulfide (COS) hydrolysis catalyst by hydrolyzing COS which is contained in a gas obtained by gasifying a carbon raw material such as coal, for example, wherein a spent COS hydrolysis catalyst is immersed in an acid solution for a prescribed amount of time and then immersed in an alkali solution for a prescribed amount of time.

The procedure of the method for regenerating a catalyst according to Embodiment 4 will be described hereinafter.

(1) First, a catalyst with which a COS conversion device of a coal gasification power plant has been filled is extracted.

(2) The dust content adhering to the extracted COS hydrolysis catalyst is removed by a gas spraying device such as an air blower.

(3) Next, a prescribed amount of an acid solution is placed in an immersion vessel, and the air-blown COS hydrolysis catalyst is immersed in the acid solution. Here, the amount of the acid solution is at least an amount which allows the COS hydrolysis catalyst to be sufficiently hidden. More preferably, the amount is such that the volume ratio of the acid solution/COS hydrolysis catalyst is at least 3.

As the acid solution, sulfuric acid ($H_2SO_4$), hydrochloric acid (HCl), nitric acid ($HNO_3$), or the like with a concentration of at least 0.1 N and approximately 1 N can be used.

In this chemical treatment, when the chemical solution is heated (for example, 60 to 80° C.), the removal efficiency of adhering sulfides or the like improves.

(4) The substance is left and immersed for approximately 15 to 60 minutes, for example, in this immersed state.

(5) Next, a prescribed amount of an alkali solution is placed in a separate immersion vessel, and the acid-treated COS hydrolysis catalyst is immersed in the alkali solution. Here, the amount of the alkali solution is at least an amount which allows the COS hydrolysis catalyst to be sufficiently hidden. More preferably, the amount is such that the volume ratio of the alkali solution/COS hydrolysis catalyst is at least 3.

As the alkali solution, sodium hydroxide (NaOH), ammonia water ($NH_4OH$), sodium carbonate ($Na_2CO_3$), or the like with a concentration of at least 0.1 N and approximately 1 N can be used.

In this chemical treatment, when the chemical solution is heated (for example, 60 to 80° C.), the removal efficiency of adhering sulfides or the like improves.

(6) Further, the immersed COS hydrolysis catalyst is then immersed and water-washed in water (for example, ion-exchanged water) prepared in a separate vessel. Here, the amount of the water washing solution is at least an amount which allows the COS hydrolysis catalyst to be sufficiently hidden. More preferably, the amount is such that the volume ratio of water/COS hydrolysis catalyst is at least 3.

(7) The substance is left and water-washed for approximately 15 to 60 minutes, for example, in this immersed state.

(8) After water washing, the COS hydrolysis catalyst is taken out and dried after excess liquid in the catalyst is removed.

Drying may be performed by means of natural drying or heat drying. In addition, the substance may also be calcined.

By performing chemical washing with an acid and then neutralizing the substance with an alkali in this way, poisoning components adhering to a COS hydrolysis catalyst can be removed, which makes it possible to reuse the substance.

[Test Examples]

Next, test examples illustrating the effect of the present invention will be described, but the present invention is not limited to these test examples.

In Test Example 1, a spent COS hydrolysis catalyst is immersed in 1 N sulfuric acid for 30 minutes at room temperature and then washed with water for 30 minutes.

In Test Example 2, a spent COS hydrolysis catalyst is immersed in 1 N sulfuric acid for 30 minutes while heating (60° C.) and then washed with water for 30 minutes.

In Test Example 3, a spent COS hydrolysis catalyst is immersed in a 1 N sodium hydroxide aqueous solution for 30 minutes at room temperature, and the alkali-treated COS hydrolysis catalyst is then neutralized by means of immersion in 1 N sulfuric acid for 30 minutes at room temperature and then washed with water for 30 minutes.

The COS hydrolysis catalyst used in these tests is a $Ba/TiO_2$ honeycomb-type catalyst, and the temperature at which the COS conversion rate of the regenerated product was measured was 300° C.

The recovery rate was determined from $K/K_0$. Here, K is a reaction rate constant of the COS hydrolysis catalyst after regeneration, and $K_0$ is a reaction rate constant of a fresh COS hydrolysis catalyst.

In these tests, the substances prior to regeneration (immediately after use) were used as comparative examples.

Using a fresh substance prior to use as a criterion of "1", the results of testing the catalyst recovery rate under various conditions are shown in FIG. 1.

As illustrated in FIG. 1, in both acid treatment alone and treatment with both an alkali and an acid, an improvement in the catalyst recovery rate was confirmed in comparison to the catalysts prior to regeneration.

In particular, in acid treatment, a greater improvement in the catalyst recovery rate was confirmed when treatment was performed while heating than when treatment was performed at room temperature.

According to these tests, the recovery rate is at least 80%, so in contrast to conventional cases in which as catalyst component is newly re-supported with a chemical, it was possible to establish a method for inexpensively regenerating a COS hydrolysis catalyst.

Figure 2:
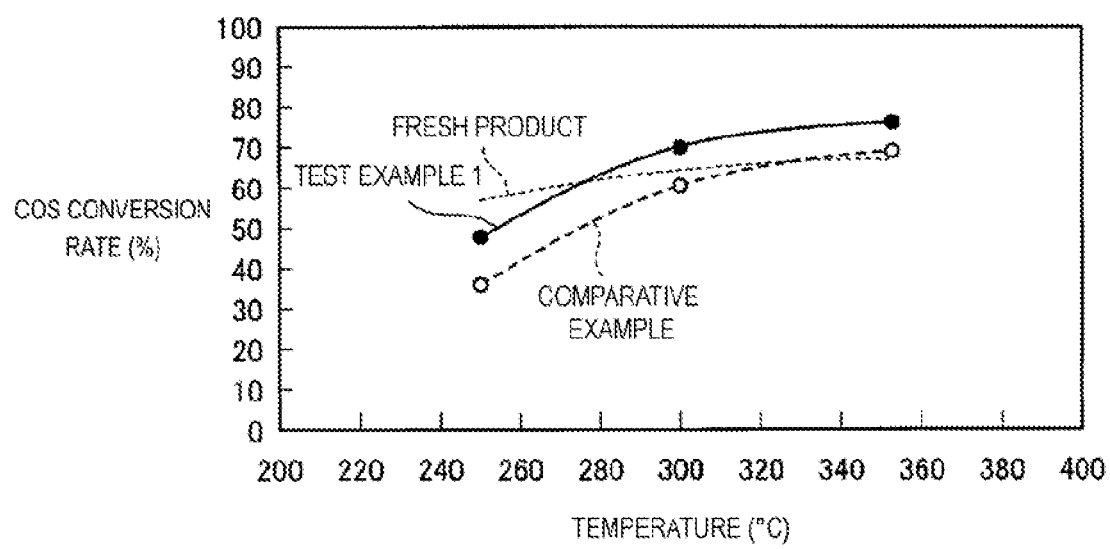
FIG. 2 illustrates the relationship between the change in temperature of a COS hydrolysis catalyst and the COS conversion rate.

FIG. 2 illustrates the relationship between the change in temperature of a COS hydrolysis catalyst and the COS conversion rate.

Using the regenerated COS hydrolysis catalyst of Test Example 1, the COS conversion rates at catalyst treatment temperatures (250° C., 300° C., and 350° C.) were measured and shown in FIG. 2.

As illustrated in FIG. 2, it was confirmed that the substances of Test Example 1 (acid-treated products) always have a higher COS conversion rate than a catalyst prior to regeneration.

In particular, it was confirmed that the acid-treated products have a higher COS conversion rate than a fresh product from a temperature range exceeding approximately 270° C.

The invention claimed is:

1. A method for regenerating a carbonyl sulfide (COS) conversion catalyst by hydrolyzing COS which is contained in a gas obtained by gasifying a carbon raw material,
    wherein a spent COS hydrolysis catalyst is immersed in an acid solution for a prescribed amount of time.

2. A method for regenerating a carbonyl sulfide (COS) hydrolysis catalyst by hydrolyzing COS which is contained in a gas obtained by gasifying a carbon raw material,
    wherein a spent COS hydrolysis catalyst is immersed in an alkali solution for a prescribed amount of time;
    and then immersed in an acid solution for a prescribed amount of time.

3. A method for regenerating a carbonyl sulfide (COS) hydrolysis catalyst by hydrolyzing COS which is contained in a gas obtained by gasifying a carbon raw material,
    wherein a spent COS hydrolysis catalyst is immersed in an acid solution for a prescribed amount of time;
    and then immersed in an alkali solution for a prescribed amount of time.

4. The method for regenerating a carbonyl sulfide (COS) hydrolysis catalyst according to claim 1, wherein
    the immersion is performed in a prescribed heated state.

5. The method for regenerating a carbonyl sulfide (COS) hydrolysis catalyst according to claim 2, wherein
    the immersion is performed in a prescribed heated state.

6. The method for regenerating a carbonyl sulfide (COS) hydrolysis catalyst according to claim 3, wherein
    the immersion is performed in a prescribed heated state.

* * * * *